FIG. 1

INVENTORS
ALLAN R. CATHERON
WILFRED H. HOWE
LEON G.S. WOOD
BY *Curtis, Morris, & Safford*
ATTORNEYS July 27, 1965   A. R. CATHERON ETAL   3,196,900
ELECTRONIC CONTROL APPARATUS
Filed April 26, 1961   8 Sheets-Sheet 2

INVENTORS
ALLAN R. CATHERON
WILFRED H. HOWE
LEON G. S. WOOD
BY Curtis, Morris, & Safford
ATTORNEYS

FIG. 7

INVENTORS
ALLAN R. CATHERON
WILFRED H. HOWE
LEON G. S. WOOD
BY *Curtis, Morris, & Safford*
ATTORNEYS

INVENTORS
ALLAN R. CATHERON
WILFRED H. HOWE
LEON G. S. WOOD

BY *Curtis, Morris, & Safford*
ATTORNEYS

July 27, 1965  A. R. CATHERON ETAL  3,196,900
ELECTRONIC CONTROL APPARATUS

Filed April 26, 1961

INVENTORS
ALLAN R. CATHERON
WILFRED H. HOWE
LEON G. S. WOOD
BY *Curtis, Morris, & Safford*
ATTORNEYS

INVENTORS
ALLAN R. CATHERON
WILFRED H. HOWE
LEON G. S. WOOD

BY *Curtis, Morris, & Safford*
ATTORNEYS

United States Patent Office

3,196,900
Patented July 27, 1965

3,196,900
ELECTRONIC CONTROL APPARATUS
Allan R. Catheron, Concord, Leon G. S. Wood, Wollaston, and Wilfred H. Howe, Sharon, Mass., assignors to The Foxboro Company, Foxboro, Mass.
Filed Apr. 26, 1961, Ser. No. 105,751
16 Claims. (Cl. 137—487.5)

This invention relates to control apparatus for industrial processes. The particular embodiment of this invention to be described hereinbelow is especially adapted for use in controlling fluid flow, i.e. maintaining the rate of flow constant.

Typically, industrial flow controllers have been of the so-called "proportioning" type wherein the flow control valve is caused to take a position proportional to the deviation between the measured flow rate and the desired flow rate (the latter generally being referred to as the "set point"). Such controllers also have included "reset" and "rate" action, in order to provide close and stable control. For many years, pneumatic devices have been used for these purposes, as shown for example in U.S. Patent 2,711,187 issued to Hoel L. Bowditch on June 21, 1955.

In recent years there has been a trend towards electrically-operable instrument systems, and accordingly various flow controllers have been developed to receive electrical measurement signals and to produce corresponding electrical output signals. Experience has shown, however, that conventional electrically-operated flow controllers of the proportioning type are relatively expensive to construct, and thus there has developed a need for a controller that is sufficiently simple in design to be manufactured economically, yet is capable of accurately controlling fluid flow. This is one of the objects of the present invention.

In the apparatus to be described in detail below, there is provided an electrical controller of the "on-off" type wherein a movable contact arm is mounted between a pair of contacts, and is shiftable in correspondence with the flow measurement signal to engage one or the other of the contacts and thereby to produce electrical output signals for operating the valve. The output of this controller is zero whenever the contact arm is within the "dead-space" zone between the contacts. Whenever the contact arm engages one of the contacts, the controller produces an output signal which causes a valve actuator to move the valve in a direction determined by which of the two contacts is engaged, and at a constant (average) speed. In this respect, the control system operates with so-called "floating control" action.

One of the difficulties with prior floating control arrangements is that, at least when fluid flow is to be controlled, it ordinarily is necessary to use relatively low valve speeds in order to avoid excessive instability or "cycling" of the process being controlled. Thus, such a slow control system may not be able to respond quickly enough to a large and sudden change in load on the process. Various proposals have, of course, been made to overcome this difficulty. For example, arrangements have been suggested wherein the valve is operable at two speeds, i.e. a low speed for responding to small deviations from set point, and a high speed for responding to large deviations. It also has been proposed to cyclically oscillate the contacts towards and away from the contact arm, as shown in U.S. Patent 2,662,547, in order to operate the valve intermittently for small deviations. However, for various reasons such prior proposals have not satisfactorily solved the problem.

In the controller of this application, the contact arm is caused to "jitter" rapidly about a mean position representing the actual flow rate of the fluid being controlled. This jitter motion of the contact arm has an amplitude larger than the distance between the two contacts, so that there is intermittent engagement between the contact arm and the contacts. However, if the mean position of the contact arm is midway between the contacts (indicating that the flow rate is at set point), the average duration of engagement with the two contacts will be equal, and hence no net correction will be introduced by the flow valve.

If the mean position of the contact arm is offset only a small amount from the midway point between the contacts (indicating a slight deviation of flow from set point), the contact arm still will engage the two contacts intermittently, but now it will engage one of the contacts for a longer time, on the average, than the other. Thus the average position of the flow valve will be shifted in a direction to rebalance the process and return the contact arm to its set point position. Because the contact engagement still is intermittent, the overall valve speed will be relatively low, and hence excessive cycling of the process is avoided. On the other hand, if there is a large and sudden change of load on the process, sufficient to shift the contact arm into continuous (non-intermittent) engagement with one of the contacts, the valve will move at its maximum overall speed to a new position and thus rapidly return the flow rate to its set point.

In this embodiment of the invention, the jitter motion of the contact arm is produced by the "noise" signal which is a natural component of the flow measurement signal. In more detail, a flow measurement signal normally is developed by a flow-sensing device which is responsive to the differential pressure across an orifice plate (or the like) inserted in the stream of flowing fluid. For various reasons, this differential pressure constantly fluctuates a small amount in a somewhat random manner, and such fluctuations are referred to as "noise." The outputs of other flow-sensing devices (such as a magnetic flowmeter) also normally will include such a noise component.

Thus, by using a flow-sensing device that has a sufficiently fast response to follow such "noise" fluctuations, and by connecting the output of such a sensing device to the means for positioning the contact arm of the "on-off" controller as previously described, it will be apparent that the contact arm will jitter back and forth in following the instantaneous value of the flow measurement signal including the noise component. Therefore, the desired intermittent contact engagement is obtained in a simple and trouble-free manner.

One additional factor involved is that the amplitude of the noise signals so developed depends upon the nature of the process itself, e.g. the noise signal amplitude for one installation may be substantially different from the amplitude at another installation. Also, the noise amplitude may vary with changes in the constituents of the fluid being controlled, and with changes in the flow rate. For example, the noise signal amplitude may be substantially smaller at low flow rates than at high flow rates. The controller to be described herein, however, is automatically self-adaptive to such variations in noise amplitude, so that no adjustments need be made at the time of equipment installation, or when there is a basic change in the character of the process.

Accordingly, it is an object of this invention to provide improved control apparatus for use with industrial processes. A more specific object of this invention is to provide an electrically-operable controller suitable for controlling the flow rate of fluids, and that is rugged in construction yet economical to manufacture. Other objects, aspects and advantages of this invention will be pointed out in, or apparent from, the following description considered together with the accompanying drawings, in which:

Figure 1:
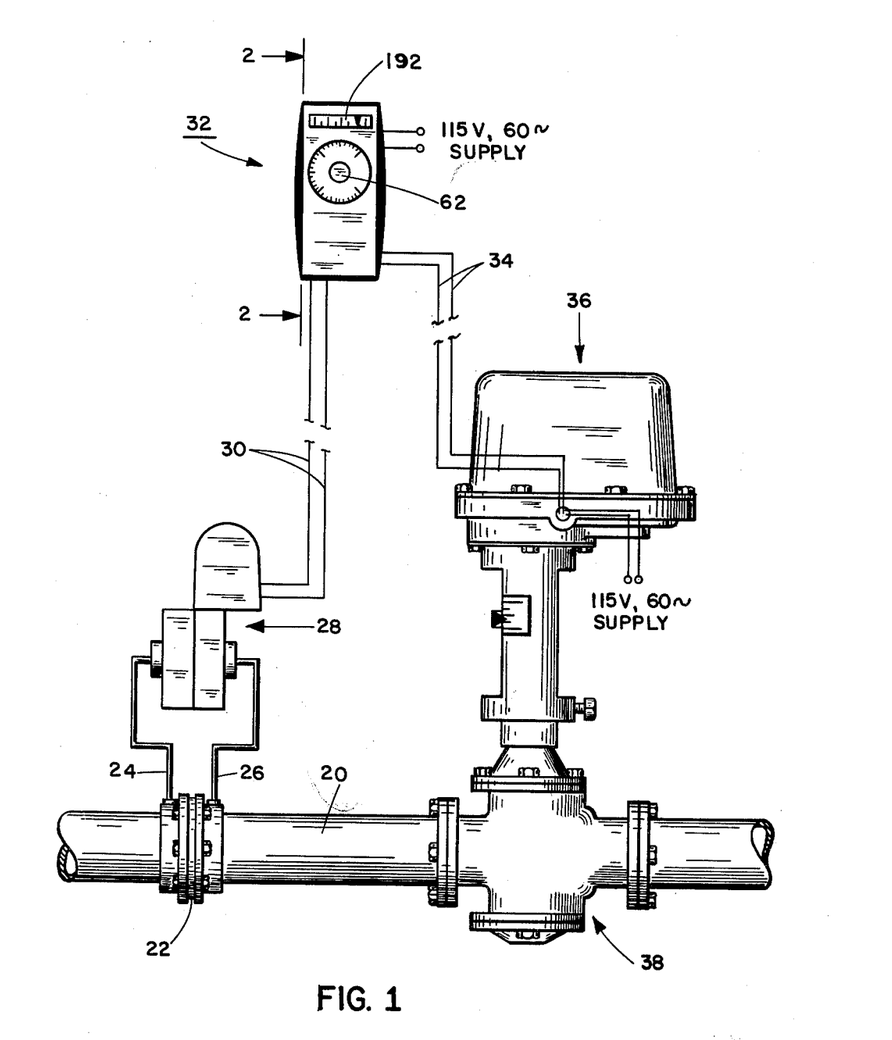
FIGURE 1 is a diagrammatic showing of a flow control system in accordance with this invention.

Referring now to FIGURE 1, there is shown a pipe 20 carrying fluid the flow rate of which is to be controlled. Inserted in this pipe is an orifice 22, the pressure drop across which is transmitted through conduits 24 and 26 to a conventional differential-pressure sensing device generally indicated at 28. This latter device preferably is of the type disclosed in U.S. Patent No. 2,946,212, issued to E. Olsen et al. on October 11, 1960, and is adapted to produce through a pair of electrical output leads 30 a D.-C. flow measurement signal (e.g. within the range of 10 to 50 milliamps) corresponding in magnitude to the fluid flow rate. These leads 30 conduct the measurement signal to a remotely-located controller, generally indicated at 32, which produces through a second pair of leads 34 a D.-C. control signal for a valve actuator generally indicated at 36. This valve actuator includes motor means (to be described) for positioning the stem of a valve 38 so as to maintain the fluid flow rate at its set point.

Figure 3:
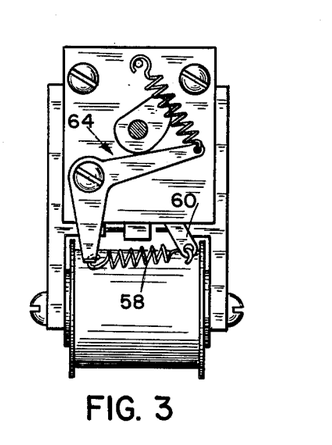
FIGURE 3 is a sectional view, taken along line 3—3 of FIGURE 2, particularly showing portions of the set point adjustment mechanism.
Figure 4:
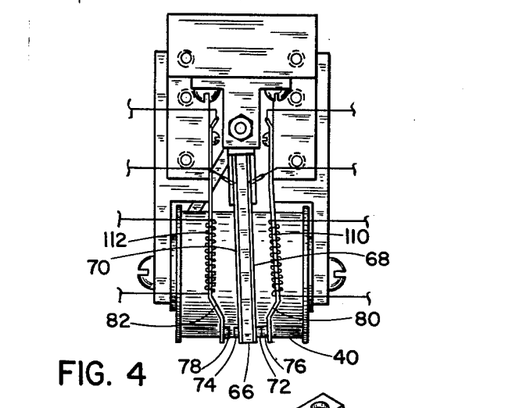
FIGURE 4 is an end view, taken along line 4—4 of FIGURE 2, to show the movable contact arm and related parts.
Figure 5:
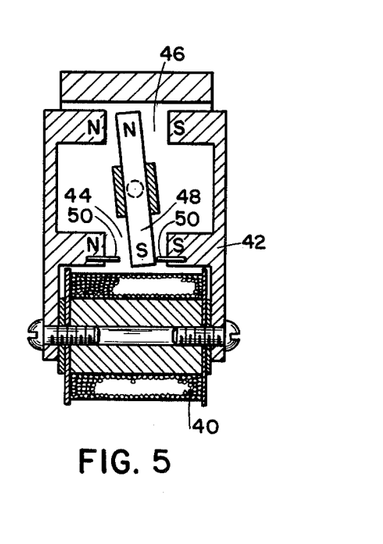
FIGURE 5 is a sectional view, taken along line 5—5 of FIGURE 2, showing details of the magnetic torque motor.

Referring now to FIGURES 2 through 6, and particularly to FIGURE 5, the D.-C. flow measurement signal on leads 30 is directed to the winding 40 of a magnetic torque motor forming part of the controller 32. The flux developed by this winding passes through a core structure 42, crossing a pair of equal-area air-gaps 44 and 46 therein. Extending between these air-gaps is a rotatable permanent magnet 48 serving as the armature of the torque motor. With the magnetic polarities indicated in FIGURE 5, it will be evident that the flux of winding 40 will tend to rotate the armature 48 clockwise, the magnitude of the torque applied to the armature being proportional to the flow measurement signal received on leads 30 from the flow-sensing device 28. Stops 50 are provided to limit movement of the armature.

Figure 2:
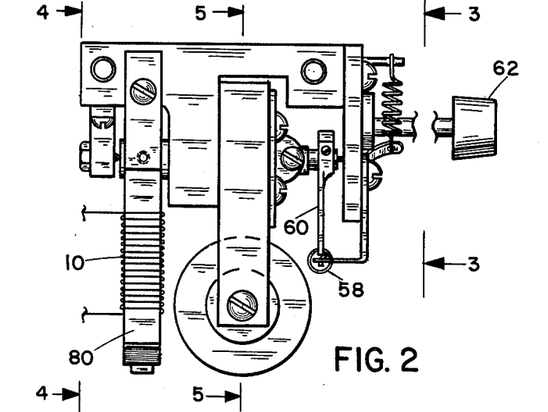
FIGURE 2 is a sectional view, taken along line 2—2 of FIGURE 1, showing certain internal details of the flow controller.
Figure 6:
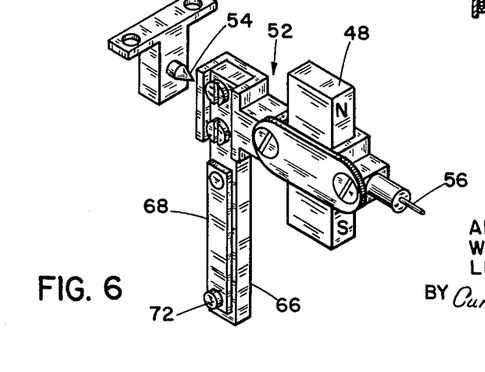
FIGURE 6 is a perspective view demonstrating the assembly of the torque motor armature and the contact arm.

As shown in FIGURE 6, the armature 48 is secured to an assembly structure 52 which is mounted for pivotal movement at bearings 54 and 56. The motor torque applied to this structure is opposed by a counter torque developed by a spring 58 and lever 60 (FIGURES 2 and 3). The magnitude of this counter torque determines the "set point" of the controller, and is adjustable by a knob 62 operating through a cam and bell crank linkage 64.

Assembly structure 52 also carries a contact arm 66 (FIGURE 6) formed of electrical insulating material, and provided on opposite sides (FIGURE 4) with electrically conductive plates 68 and 70 each having at its lower end a contact button 72 and 74. These buttons are adapted to engage corresponding contacts 76 and 78 mounted on the ends of respective flexible strips 80 and 82.

Figure 7:
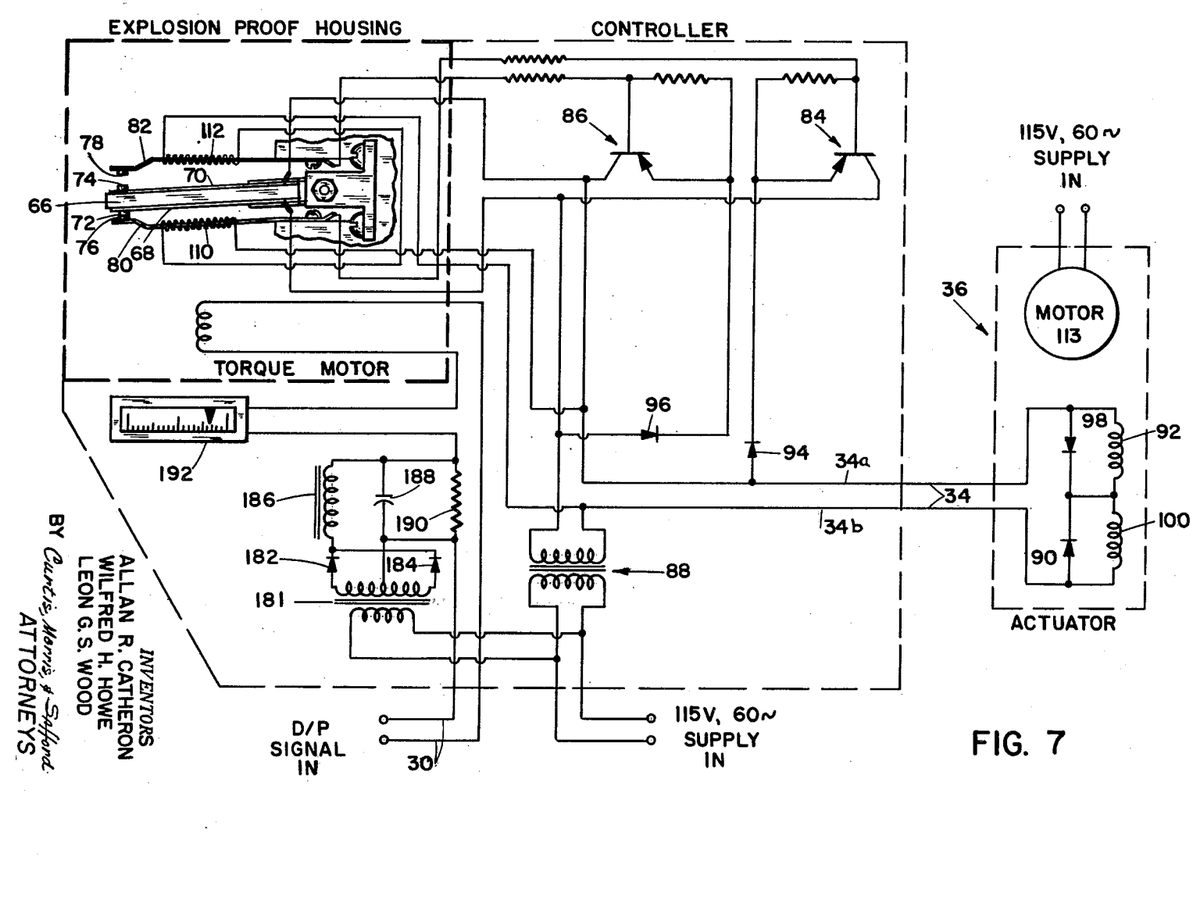
FIGURE 7 is a circuit diagram, particularly showing the switching circuitry for energizing the valve actuator.

Referring now to the upper left-hand corner of the circuit diagram of FIGURE 7, the conductive plates 68 and 70 and the flexible strips 80 and 82 are connected to a buffer amplifier consisting of a pair of transistor switches 84 and 86 which control the flow of current from a power transformer 88 through leads 34 to the valve actuator 36. The buffer amplifier reduces the current flow through the contacts 76 and 78, thus prolonging their life. When one of these contacts is engaged by its button 72 or 74, the corresponding switch 84 or 86 will be closed, and current will flow to actuator 36 in one direction or the other (i.e. the controller output signal will be either positive or negative), depending upon which switch is closed. The actuator 36 thereupon drives the valve 38 with a step-by-step movement (as will be explained) in a direction depending upon whether the signal to the actuator is positive or negative.

In more detail, when contact 76 is engaged by button 72 on plate 68, the resulting electrical connection closes the first transistor switch 84. Thereupon, half-wave pulses of current will flow from the right-hand end of the secondary winding of transformer 88, to the right along the lower output lead 34b, through a rectifier 90 and one solenoid coil 92 in the valve actuator 36, back along upper lead 34a, through a rectifier 94 to the emitter of transistor 84, and from the collector of this transistor back to the left-hand end of transformer 88. Similarly, when the other transistor switch 86 is closed by its contact 78, half wave pulses of current will flow from the left-hand end of transformer 88, through a rectifier 96 to the emitter of transistor 86, from the collector of this transistor through the upper lead 34a to actuator 36, through a rectifier 98 and the other solenoid coil 100 in the actuator, and back along lead 34b to the right-hand end of transformer 88. One advantage of this valve-actuating circuit is that it permits "three-state" operation (i.e. solenoid 92 energized, solenoid 100 energized, or neither energized) over a transmission line having only two wires, thus reducing installation costs particularly when the controller 32 is located a substantial distance from the valve actuator 36.

Reviewing the operation of the apparatus described thus far, the sensing device 28 develops a D.-C. measurement signal corresponding to the rate of flow through pipe 20, and transmits this signal to the controller 32. In the controller, this measurement signal energizes a torque motor which tends to rotate contact arm 66 clockwise (as seen in FIGURE 4), while a spring mechanism applies a counterclockwise torque to the contact arm. If the measurement signal is sufficiently large to overcome the spring torque, the contact arm will move to engage the left-hand contact 78 and thereby produce a flow of D.-C. current through the lower solenoid coil 100 in the valve actuator 36. As will be explained in detail, this actuator thereupon drives the valve in a direction tending to reduce the fluid flow rate, thereby reducing the magnitude of the flow measurement signal. When this signal becomes sufficiently small that the torque it applies to contact arm 66 is less than the spring-applied torque, the contact arm will move to engage the other contact 76, thereby energizing the other solenoid coil 98 and driving the valve back to increase the flow rate. When neither contact 76 or 78 is engaged, no current will flow to actuator 36 and the valve will remain stationary.

In actual practice, the flow measurement signal from the sensing device 28 will fluctuate rapidly, in a somewhat random manner, about a mean value representing the flow rate of the fluid. In other words, the flow measurement signal has a "noise" component which may, for example, be due to turbulence or similar effects in the flow. Consequently, the contact arm 66 will fluctuate rapidly back and forth between the two contacts 76 and 78.

Figure 8:
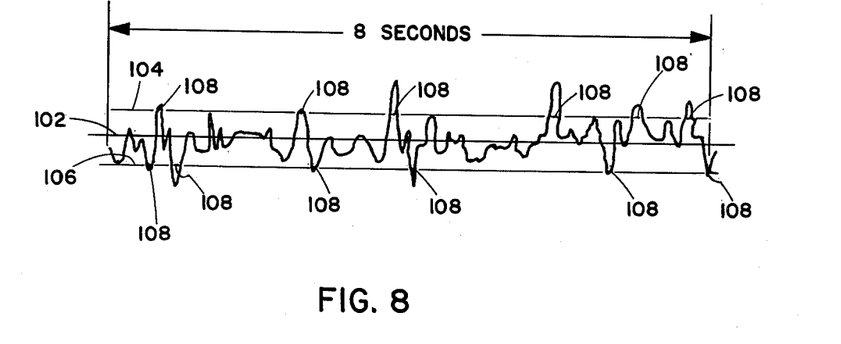
FIGURE 8 is a graph demonstrating the movements of the contact arm due to the "noise" component of the flow signal.

With these contacts 76 and 78 spaced apart a distance less than the maximum amplitude of the noise fluctuations, the contact arm 66 will, for part of the time, engage one or the other of the contacts. If the flow rate is at set point, moreover, the average time duration of engagement with contact 76 will be equal to the average time duration of engagement with contact 78, and thus there will be no net movement of the valve 38. This condition is represented by the graph of FIGURE 8, where the curve (based on an actual recording of flow measurement noise over a period of 8 seconds) indicates the position of the contact arm as a function of time. In this graph, the center line 102 corresponds to a position midway between the two contacts, the locations of which are signified by horizontal lines 104 and 106. The actual time of contact engagement is represented by the heavy line portions 108.

Figure 9:
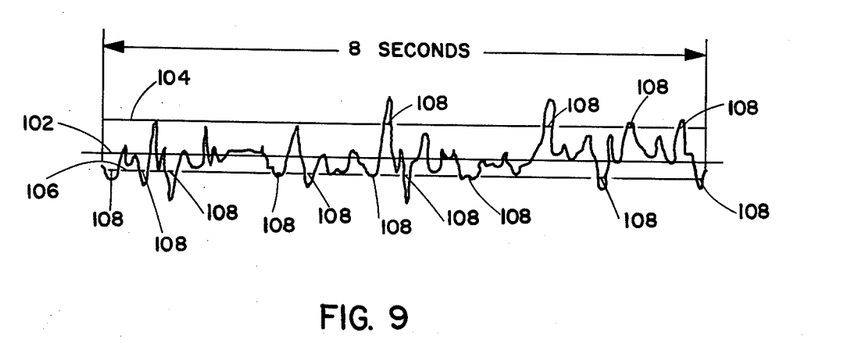
FIGURE 9 is a graph like FIGURE 8, but showing the effect of a small deviation from set point.

If the fluid flow rate deviates from set point, the mean position of the contact arm 66 will move away from the midway position between the contacts 76 and 78, i.e. it will move nearer to one of these contacts, so that the average time of engagement with that one contact will increase, and the average time of engagement with the other contact will decrease. This condition is represented by the graph of FIGURE 9, which is identical to FIGURE 8 except that the entire curve has been shifted downwards a small amount. In such a situation, current will flow into the valve actuator 36 in one direction for a longer period of time, on the average, than it will flow in the other direction. Thus, actuator 36 will drive valve 38 to a new position to restore the flow rate to its set point.

If the flow rate deviates a substantial amount from set point, the mean position of the contact arm 66 may be shifted towards one contact 76 or 78 a sufficient distance that on its reverse swing it never touches the other contact at all, and it is possible that it may even engage one contact continuously for a substantial length of time. In the latter case, the valve 38 will be driven towards the new balance position at its maximum rate of movement.

To obtain best control results, the spacing of the contacts 76 and 78 must be set at an optimum distance relative to the noise amplitude. If the spacing is larger than this optimum, the valve will not be operated with desirable frequency until the deviation from set point becomes quite large, and hence the control will be sluggish. On the other hand, if the spacing is too small, the arm will remain in engagement with the contacts for relatively long times, and there will be excessive valve activity (with too great wear and tear), if not actual cycling of the process.

The optimum spacing for the contacts 76 and 78 can readily be determined by test. With the equipment disclosed herein, it was found that the spacing of the contacts should be set to give about one contact engagement per second, on an average, as generally indicated in the graph of FIGURE 8. This graph also shows that the noise signal apparently included a fundamental frequency component of about one cycle per second, the principal peaks of which were usually responsible for closing the contacts.

It also has been found that the amplitude of the noise signal produced by the sensing-device 28 is not a constant value for all situations. For example, if the control system described herein were used with a flow pipe of quite different size or configuration, or with a different type of fluid, the noise amplitude could be expected also to differ. And in a given installation, there will be variations in noise amplitude with changes in average flow rate, e. g. if the set point were changed from 80% of maximum flow to 20%. Thus, it is desirable to provide some means for adjusting the controller to accomodate such variations in noise amplitude.

Advantageously, this controller adjustment should be automatic. By such means, controllers of standard design may be manufactured without reference to the intended application, and installed without the usual "tune-up" complexities encountered in more conventional controllers. Also, flow rate set points can be changed without the need for further manipulation of the equipment. The controller described herein is provided with such an automatic adjustment, as will now be described.

Referring again to FIGURES 2, 4 and 7, the contact-carrying flexible strips 80 and 82 are thermostatic bimetals which flex to different positions with changes in their temperature. These bimetals are surrounded by electrical heater wires 110 and 112 which are connected in series and energized by a circuit paralleled with the actuator leads 34. Thus, whenever either of the transistor switches 84 or 86 closes (in response to engagement of contacts 76 or 78), current also will flow from power transformer 88 through these heater wires.

The bimetal strips 80 and 82 have a sufficiently high heat capacity that, under normal operating conditions (e. g. as indicated in FIGURE 8), these strips will remain substantially stationary. The average amount of heat being supplied to these strips will be just sufficient to maintain the correct contact spacing for the particular noise amplitude conditions then existing. If there is an increase in the noise amplitude, the immediate effect will be a corresponding increase in the average length of time that both contacts 76 and 78 are engaged with the contact arm 66. Thus, the transistor switches 84 and 86 both will be closed for a greater part of the time, and the heaters 110 and 112 will receive a higher average current than previously.

Accordingly, the temperature of the bimetal strips 80 and 82 will increase, and both strips ultimately will flex (outwardly) to new positions where the contacts 76 and 78 are spaced farther apart. Advantageously, the time-constant of the bimetals (i.e. the time required to reach two-thirds of the distance to the new position) is greater than the average period between contact closures when the flow is at set point. Thus, with the noise conditions for the equipment described herein, the time constant of the bimetals should be greater than one second, and preferably substantially (i.e. 5 or 10 times) greater.

These bimetal strips 80 and 82 are sufficiently sensitive to temperature changes that a relatively small increase in current flow through the heaters 110 and 112 produces a substantial increase in contact spacing. Therefore, the contacts 76 and 78 will be moved out to new positions where the average time of engagement with the contact arm 66 will be very nearly the same as it was before the noise signal amplitude changed. If the noise signal amplitude decreases, of course, the action will be reversed, i.e. the contacts 76 and 78 will be moved closer together in order to maintain the average time of contact engagement very nearly constant.

Thus, this feature makes it possible to produce a flow controller of standardized design which can be installed on any process without the need for special manipulations to match the controller to the particular process characteristics encountered. This result is achieved because the controller, in effect, automatically measures the process characteristic (i.e. noise signal amplitude) to which the controller must be adjusted, and automatically makes the necessary adjustments to the corresponding controller parameter (i.e. the "dead space" between the contacts 76 and 78) to suit the measured characteristic. In this sense, the controller is "adaptive" to the process with which it is being used.

In the event that the controller is used in a place where ambient temperature changes are significant, any effects from this source can be avoided by using non-heated Motor 113 is energized continuously from an A.-C. supporting the contacts 76 and 78. These added strips should be arranged so that, in the event of an ambient temperature change, they oppose and cancel out any tendency of the heated strips 80 and 82 to move the contacts 76 and 78 due to such ambient temperature changes.

Figure 10:
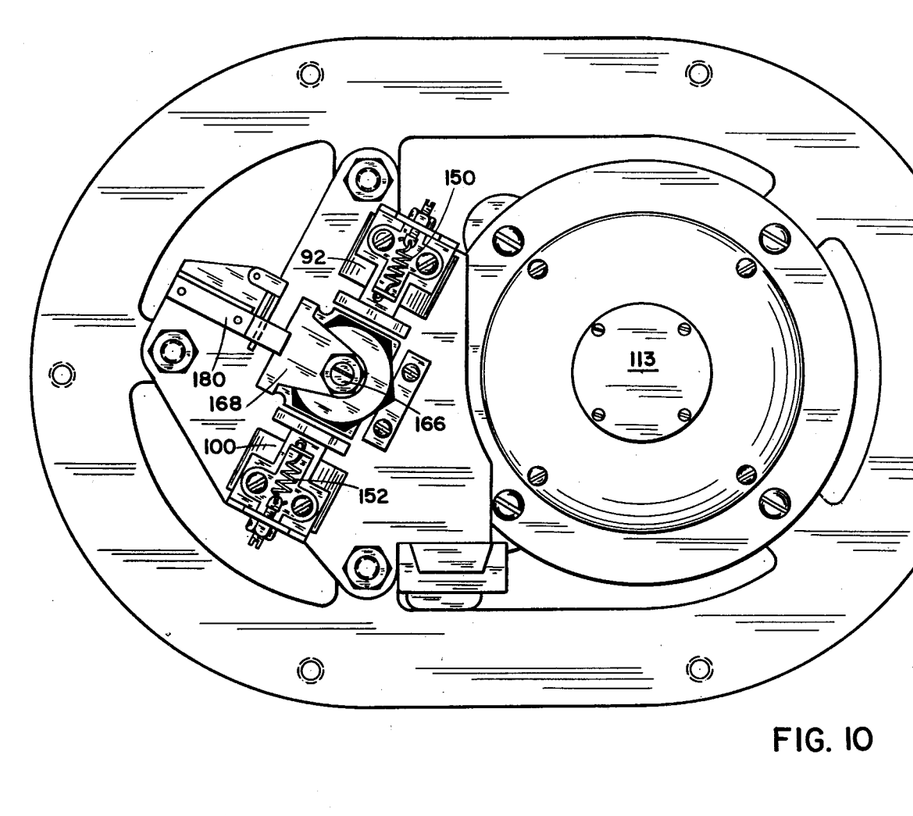
FIGURE 10 is a top view of the valve actuator, shown with the cover removed.
Figure 13:
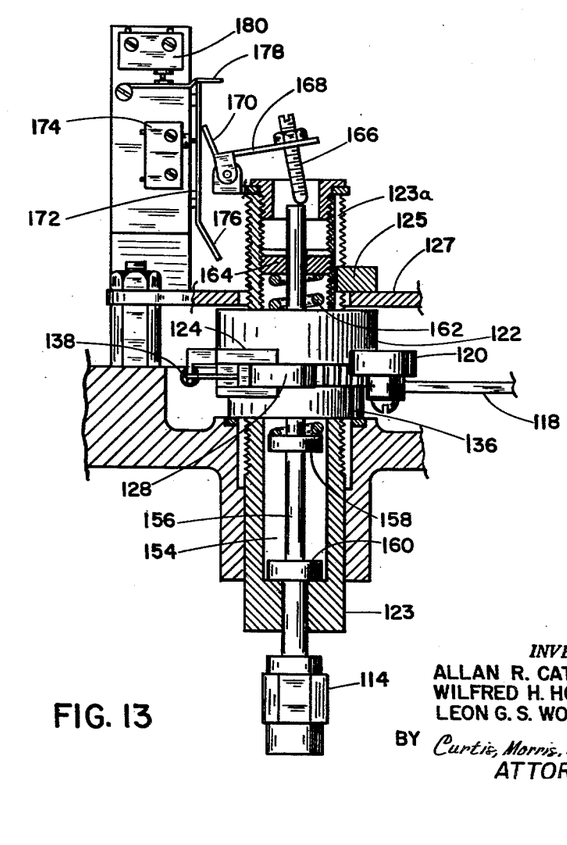
FIGURE 13 is a side view of the valve actuator, partly in section, and showing certain aspects of the stem driving mechanism.

Referring now in more detail to the valve actuator 36, as shown in FIGURE 10 this actuator includes an electric motor 113 which furnishes the motive energy for raising or lowering the valve stem 114 (FIGURE 13). Motor 113 is energized continuously from an a.-c. supply line, its power being used to move the valve stem in periodic steps whenever a control signal is transmitted to the actuator 36 from the controller 32.

Figure 12:
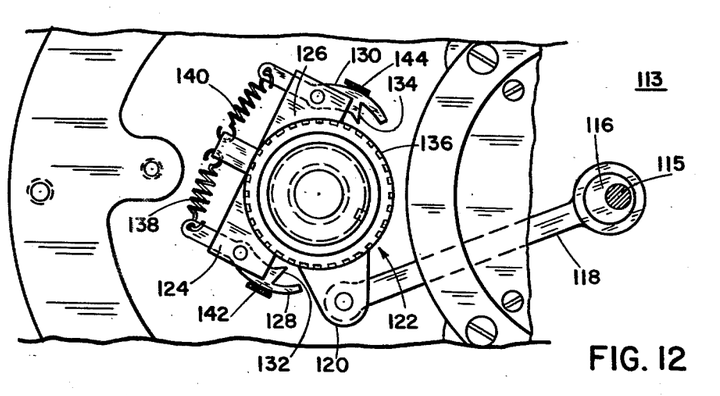
FIGURE 12 is a horizontal section of the valve actuator showing the eccentric crank drive.

As shown in FIGURE 12, the shaft 115 of motor 113 is coupled through an eccentric 116 to a connecting rod 118. The left-hand end of this rod is pinned to a shoulder 120 (see also FIGURE 13) forming part of a rotary drive member 122. This drive member is coaxially mounted about a drive screw 123 coupled to the valve stem 114. As the motor shaft rotates, the connecting rod 118 reciprocates so as to oscillate the drive member 122 back and forth through a small angle about the vertical axis of the drive screw 123.

Figure 14:
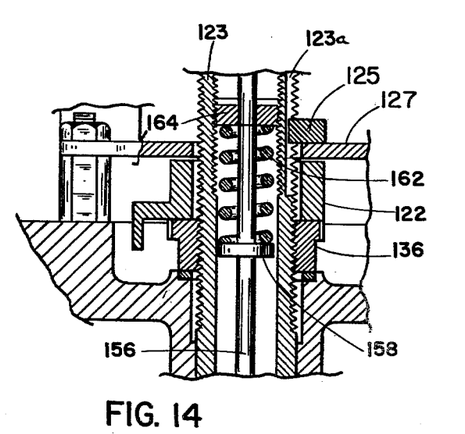
FIGURE 14 is a vertical section based on FIGURE 13, but showing further internal details.
Figure 15:
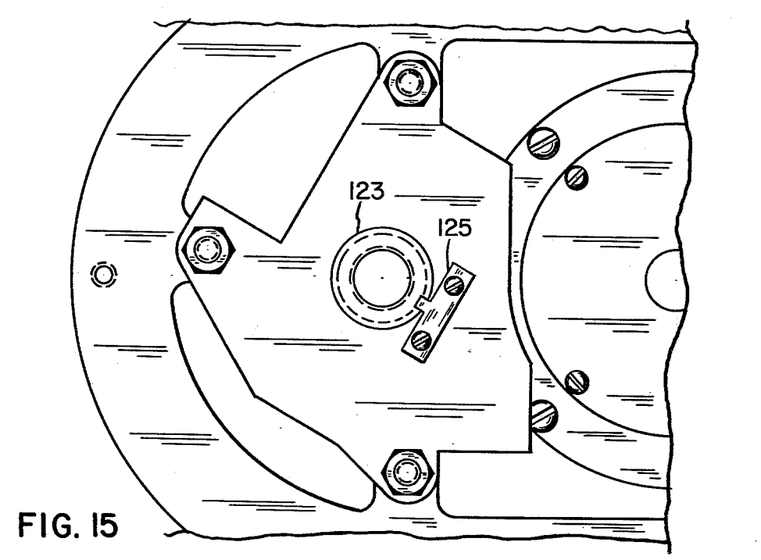
FIGURE 15 is a horizontal section of the valve actuator, particularly indicating the manner in which the drive screw is keyed to the actuator support structure.

The rotary drive member 122 also is formed with a pair of lateral wings 124 and 126 each carrying a respective pawl 128 and 130 pivotally mounted thereon. These pawls are provided at one end with teeth 132 and 134 adapted to engage the longitudinal slots in a rotatable drive nut 136 having an internal thread (see FIGURE 14) engaged with the outer threads of the drive screw 123, and secured against axial movement by suitable bearing surfaces. The pawl teeth are urged away from this drive nut by springs 138 and 140 connected to the remote ends of the pawls.

Figure 11:
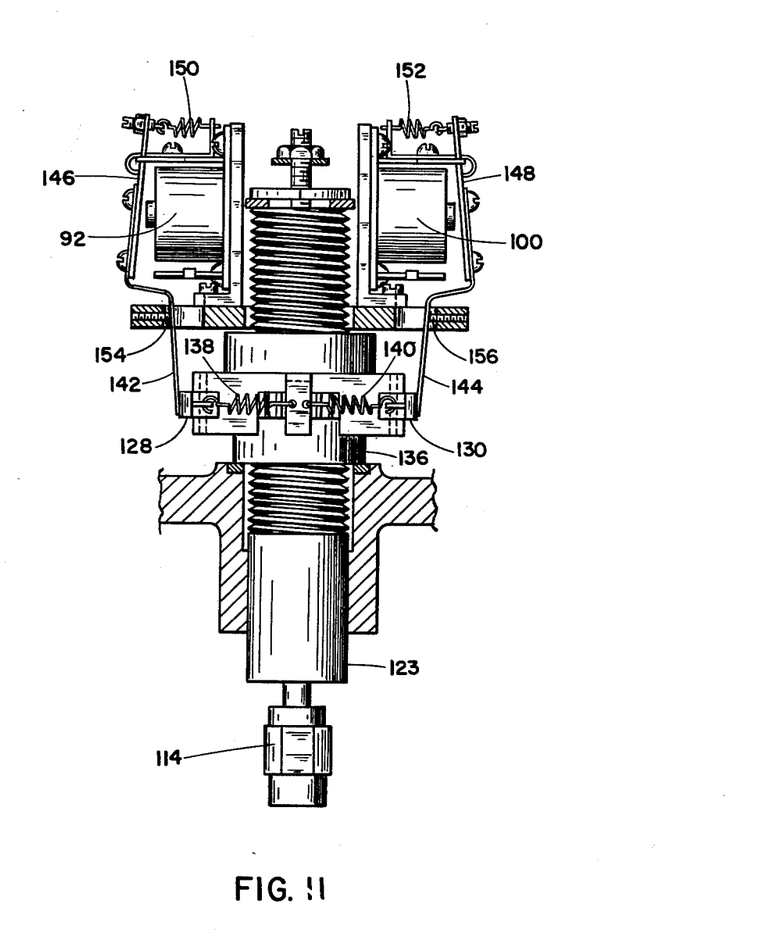
FIGURE 11 is a side view of certain portions of the valve actuator.

As shown in FIGURE 11, the outer edges of pawls 128 and 130 are engaged by respective spring strips 142 and 144 carried by armatures 146 and 148 of the solenoids 92 and 100, previously mentioned. These armatures also are provided with springs 150 and 152 to urge the lower ends of the strips 142 and 144 outwards against stops 154 and 156 which are positioned to hold the strips 142 and 144 lightly against the pawls 128 and 130.

When the controller 32 transmits a signal to the valve actuator 36, one of the solenoids 92 or 100 will be energized as described hereinabove. Assuming, for example, that the left-hand solenoid 92 (FIGURE 11) is energized, its armature 146 will be pulled to the right onto the solenoid core, thereby moving the spring strip 142 to the right. This motion of the strip will shift the pawl 128 (FIGURE 12) in against the drive nut 136 to provide engagement between the pawl tooth 132 and one of the longitudinal slots in this drive nut. With the rotary drive member 122 continuously oscillating, it will be evident that the pawl 128 will ratchet the drive nut counterclockwise (referring to FIGURE 12) in a periodic step-by-step manner. The throw of the eccentric 116 is so set that the drive nut is rotated an angular distance corresponding to the spacing between its longitudinal slots for each oscillation of the drive member.

Referring again to FIGURE 13, the threaded drive screw 123 is formed with a vertical keyway 123a, and a key 125 secured to a support plate 127 extends into this keyway to prevent rotation of the drive screw. Thus, counterclockwise rotation of the drive nut 136 causes the drive screw to move vertically (downward, in this case), thereby shifting valve stem 114 so as to change the setting of the flow control valve 38.

When the signal from the controller 22 stops (i.e. goes to zero), the solenoid 92 will be deenergized, and the pawl 128 will be pulled by the pawl spring 138 away from the drive nut 136, and accordingly the drive nut rotation will stop. If the controller transmits a signal of opposite polarity, the other solenoid 100 will be energized (as previously explained) and its associated pawl 130 will engage the drive nut 136 and ratchet it clockwise so as to shift the valve stem 114 in the opposite direction.

In the equipment described herein, the motor 113 operated at about 1750 r.p.m., and about 15 to 30 seconds was allowed for full travel of the valve. Depending upon the time selected for full valve travel, the individual steps were between approximately 1/10% and 1/4% of full valve stroke.

The valve actuator 36 also is provided with overload and over-travel cutout means to stop the drive when the valve closing movement is impeded (as by a foreign body in the flow stream) or when the valve has reached predetermined limits. In more detail, the drive screw 123 is formed with a coaxial cavity 154 for a rod 156 which extends through a hole in the bottom of drive screw 123 to the valve stem 114. Within the cavity 154, the rod 156 carries a pair of spaced collars 158 and 160, the lower one of which normally abuts the bottom of the cavity 154, and provides positive coupling between drive screw 123 and valve stem 114 for upward movements of the drive screw. A coiled spring 162 rests on the upper collar 158, and extends up to a disk 164 threadedly engaged with the walls of the cavity 154, to provide a resilient coupling between the drive screw and the valve stem for downward movements. The rod 156 extends through a hole in disk 164 and is engaged at its top by the end of a bolt 166 carried on a pivotally-mounted lever 168.

Figure 16:
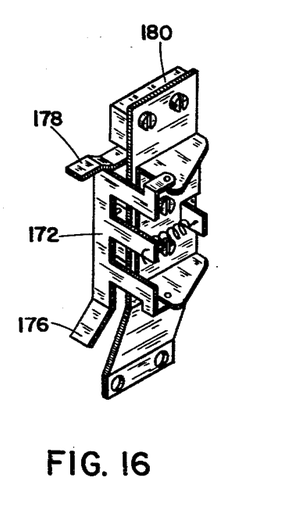
FIGURE 16 is a perspective view of the over-travel switch arrangement.

When the drive screw 123 is driven downwards, its movement is transmitted through spring 162, collar 158, and the drive rod 156 to the valve stem 114. If the downward movement of stem 114 is impeded by a foreign object in the valve, the spring 162 will be compressed to absorb the closing force of the drive screw 123. Since under these conditions rod 156 will remain stationary, further downward movement of screw 123 will cause the lever 168 to rotate counterclockwise. The free arm 170 of this lever thereby is pressed against an actuating member 172 (see also FIGURE 16) of a limit switch 174, causing this switch to open and (through conventional circuit means, not shown) interrupt the energizing circuit to the solenoid 92. Thus the corresponding pawl will be disengaged to stop the valve drive, and assure that no damage occurs to the actuator or valve mechanisms.

If the valve stem 114 is driven down without encountering any stoppage, the free arm 170 of lever 168 ultimately will engage an offset ear 176 at the bottom of actuating member 172 and thereby open switch 174 to interrupt the energizing circuit for solenoid 92. Thus, the valve drive will be stopped before damage can occur from downward overtravel. A similar protection is provided from upward overtravel, in that the arm 170 will engage a pivoted horizontal member 178 to operate another limit switch 180 and interrupt the energizing circuit for solenoid 100. Thus, the upward movement is automatically stopped before any damage can occur.

Referring again to FIGURE 7, the leads 30 of the differential-pressure sensing device 28 are energized by a conventional power supply which comprises a power transformer 181 connected to a full-wave rectifying circuit including a pair of diodes 182 and 184. The D.-C. output of this circuit is filtered by a choke 186 and a capacitor 188, and the resulting D.-C. signal is applied across a line resistor 190 in series with the leads 30. Also connected in series with these leads is a meter 192 which is mounted on the front panel of the controller 32 (FIGURE 1), and which serves to indicate the magnitude of the flow rate. The knob 62 on the front panel of the controller is operative through the linkage 64 (FIGURE 3) to vary the force applied by the spring 58 to the assembly structure 52. If this knob is rotated so as to reduce the spring torque, the contact arm 66 will tend to move over towards the contact 78, and thereby increase the average time of engagement with that contact. Thus the controller output will be altered so as to cause a shift in position of the valve 38 and provide a new condition of balance for the system. It will be apparent therefore that the positioning of the knob 62 determines the set point of the controller.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. In a control system wherein control apparatus is responsive to changes in the magnitude of a condition measurement signal and is thereby operable to alter a process variable in such a manner as to tend to maintain the measured condition constant at a preselected value, and wherein a secondary non-controlled characteristic of the process influences the effectiveness of the control apparatus in such a manner that a parameter of the control apparatus must be set in conformance with the magnitude of said characteristic in order properly to maintain said process condition constant; said system comprising, in combination, a sensing device operable to produce a measurement signal corresponding to the process condition to be controlled, control apparatus responsive to said measurement signal and including means to develop an output signal related to the difference between the actual value of said process condition and a desired value thereof, operating means forming part of said control apparatus for detecting the magnitude of said secondary process characteristic, and adjustment means automatically responsive to said operating means for setting said parameter of said control apparatus in accordance with the detected magnitude of said secondary process characteristic.

2. An industrial process control system comprising, in combination, condition sensing means operable to produce a measurement signal corresponding to the process condition to be controlled, a controller responsive to said measurement signal and including operating means for developing an output signal dependent upon the difference between the actual value of said process condition and a desired value thereof, detection means responsive to a secondary characteristic of said process which determines the nature of the output signal to be developed by said operating means, and adjustment means responsive to the detected magnitude of said secondary characteristic for automatically altering a parameter of said controller effective to compensate for variations in said secondary characteristic.

3. An industrial process control system comprising, in combination, a sensing device operable to produce a measurement signal corresponding to the process condition to be controlled, said measurement signal including a component reflecting the magnitude of a secondary characteristic of the process, a controller responsive to said measurement signal and including operating means for developing an output signal dependent upon the difference between the actual value of said process condition and a desired value thereof, said operating means also being sensitive to said signal component to change the nature of said output signal in response to variations in said signal component, and adjustment means automatically responsive to the magnitude of said signal component for setting a controller parameter which is effective to compensate the controller operation for changes in the magnitude of said secondary characteristic.

4. A control system comprising, in combination, condition sensing means operable to produce a measurement signal including a fundamental component corresponding in magnitude to that of the process condition to be controlled and having superimposed thereon a rapidly varying signal component, a controller including operating means for receiving said measurement signal and for developing an output signal related to the difference between the actual value of said process condition and a desired value thereof, said operating means being responsive to said rapidly varying signal component for affecting said output signal in accordance with a selected characteristic of that signal component, said controller also including compensation means arranged to influence the response of said operating means to said rapidly varying signal component, and adjustment means automatically operable in response to changes in said characteristic to alter said compensation means and thereby maintain the effectiveness of said control system substantially constant.

5. A controller comprising a movable member adapted to be positioned in accordance with a measurement signal which includes a fundamental component and a superposed rapidly varying component, a pair of contacts positioned on opposite sides of said movable member to be engaged by said member as it fluctuates back and forth under the influence of said rapidly varying component, circuit means coupled to said contacts to develop a control signal corresponding to the average time of engagement with said contacts respectively, and means responsive to the magnitude of said rapidly varying component for setting the spacing between said contacts so as to tend to maintain the total average time of engagement therewith constant.

6. Process control apparatus comprising, in combination, sensing means for producing a measurement signal including a superposed jitter component, a shiftable member adapted to be positioned in accordance with said measurement signal including said jitter component, an electrical device located adjacent said member and adapted to be influenced by said member at a particular physical relation thereof with respect to said device, circuit means connected to said electrical device for producing an output control signal in accordance with the extent of influence exerted on said device by said member, and adjustment means responsive to said control signal for altering the relative positioning of said shiftable member and said electrical device, said adjustment means having a response time-constant greater than the average period between the times when said member is moved by said jitter component into said particular physical relation with respect to said electrical device, whereby said adjustment means is substantially unaffected by the individual variations in said jitter component but is affected by changes in the average amplitude thereof.

7. Process control apparatus comprising, in combination, sensing means for producing a condition measurement signal including a superposed jitter component, a shiftable member adapted to be positioned in accordance with said measurement signal including said jitter component, a pair of electrical devices located adjacent said shiftable member and adapted to be influenced alternatively by said member at particular positions thereof with respect to said devices, circuit means connected to said electrical devices for producing an output control signal reflecting the influence exerted on said devices by said member, and adjustment means responsive to said control signal for changing the relative positioning of said devices with respect to said shiftable member in such directions as to simultaneously increase or decrease the influence of said shiftable member on both of said devices.

8. An industrial process controller comprising, in combination, a shiftable member adapted to be positioned in accordance with a measurement signal including a rapidly varying signal component, a pair of contact means positioned adjacent said member to be operated thereby as said member is shifted back and forth to follow said measurement signal, circuit means connected to said contact means for producing an output control signal corresponding to the extent of operation of said contact means by said shiftable member, and adjustment means under the influence of said control signal for moving said contact means simultaneously towards or away from said shiftable member in response to changes in said control signal.

9. An industrial process controller comprising a shiftable member adapted to be positioned in accordance with a rapidly fluctuating measurement signal, a pair of electrical contacts on opposite sides of said member to be engaged thereby as said member shifts back and forth, support means for said contacts and adapted to provide movement of said contacts towards and away from said member, circuit means connected to said contacts to produce an electrical output signal having a characteristic dependent upon which of said contacts is engaged, signal-responsive means coupled to the output of said circuit means and operable to shift both of said contacts simultaneously towards or away from said member in response to changes in the average magnitude of said control signal.

10. Process control apparatus comprising, in combination, means for producing a condition measurement signal including a superposed jitter component, a shiftable member adapted to be positioned in accordance with said measurement signal including said jitter component a pair of bimetal strips mounted on opposite sides of said member, electrical contacts mounted on said bimetal strips to be engaged by said shiftable member, circuit means connected to said electrical contacts for producing a control signal, and heater means under the influence of said control signal for changing the temperature of both of said bimetal strips simultaneously so as to alter the spacing between said contacts in response to changes in the average magnitude of said control signal.

11. Apparatus as claimed in claim 10, wherein said circuit means includes an output circuit adapted to produce positive and negative signals depending upon which of said contacts is engaged by said shiftable member.

12. Apparatus as claimed in claim 11, wherein said output circuit comprises a transistor buffer amplifier.

13. Apparatus as claimed in claim 11, wherein said heater means comprises first and second heater elements associated respectively with said bimetal strips, said heater elements being connected together across said output circuit to be influenced simultaneously by variation in said control signal.

14. Industrial process control apparatus comprising, in combination, sensing means for producing an electrical measurement signal corresponding to a process condition, contact means responsive to said measurement signal for developing a control signal of reversible polarity in accordance with whether said measurement signal is higher or lower than a predetermined value, a two-wire transmission line for said control signal, first and second solenoid coils connected to said two-wire line for receiving current therefrom, first and second rectifiers connected to said solenoid coils respectively for preventing the flow of current into the associated coil when said control signal is of a particular polarity, said rectifiers being reverse-polarized relative to one another whereby only said first coil is energized by a current of one polarity and only said second coil is energized by a current of the opposite polarity, and valve driving means operable by said solenoid coils to regulate a characteristic of the process in a direction determined by which of said solenoid coils is energized by said control signal, thereby to maintain said measured process condition constant.

15. Control apparatus comprising means for developing a measurement signal which includes both a fundamental component corresponding to a process condition and a superposed rapidly varying component, a movable member, means for positioning said member in accordance with said measurement signal, sensing means adjacent said member adapted to be influenced by said member in accordance with the proximity thereof as determined by said positioning means, circuit means coupled to said sensing means to develop a control signal corresponding to the average duration of time said member exceeds a selected distance from a predetermined position, means responsive to said rapidly varying component for altering said selected distance so as to tend to maintain constant said average length of time, and means for effecting changes in the measured process condition in accordance with variations in said control signal.

16. Process control apparatus comprising, in combination, means for developing a measurement signal representing the actual value of the controlled process condition with a rapidly fluctuating signal superimposed thereon, an instrumentality responsive to said measurement signal and including means for production and output signal corresponding to the average duration of time that the value of said measurement signal deviates beyond a selected value, means responsive to said rapidly fluctuating signal for adjusting said selected value in accordance with changes in the amplitude of said fluctuating signal, and means responsive to said output signal for effecting changes in said process condition.

References Cited by the Examiner

UNITED STATES PATENTS

| | | | |
|---|---|---|---|
| 1,538,427 | 5/25 | Earl | 137—8 |
| 1,544,716 | 7/25 | Behr | 137—8 |
| 1,658,577 | 2/28 | Smoot. | |
| 2,310,678 | 2/43 | Crew et al. | 251—133 |
| 2,662,547 | 12/53 | Comeau | 137—468 |
| 2,764,701 | 9/56 | Miller | 307—116 |
| 2,837,664 | 6/58 | Lindstrom et al. | 307—116 |
| 2,872,154 | 2/59 | Jones | 251—133 |
| 2,926,691 | 3/60 | Huff | 137—487.5 |
| 2,948,295 | 8/60 | Smith | 137—487.5 |

M. CARY NELSON, *Primary Examiner.*

ISADOR WEIL, MARTIN P. SCHWADRON,
*Examiners.*

UNITED STATES PATENT OFFICE
CERTIFICATE OF CORRECTION

Patent No. 3,196,900

July 27, 1965

Allan R. Catheron et al.

It is hereby certified that error appears in the above numbered patent requiring correction and that the said Letters Patent should read as corrected below.

Column 12, line 39, for "production and" read -- producing an --.

Signed and sealed this 22nd day of March 1966.

(SEAL)
Attest:

ERNEST W. SWIDER
Attesting Officer

EDWARD J. BRENNER
Commissioner of Patents